United States Patent
Di Marco et al.

(10) Patent No.: US 12,167,331 B2
(45) Date of Patent: Dec. 10, 2024

(54) WAKEUP RADIO FOR LOW POWER NODES IN BLUETOOTH

(71) Applicant: Telefonaktiebolaget LM Ericsson (publ), Stockholm (SE)

(72) Inventors: Piergiuseppe Di Marco, Teramo (IT); Per Skillermark, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 589 days.

(21) Appl. No.: 17/598,396

(22) PCT Filed: Jun. 11, 2019

(86) PCT No.: PCT/EP2019/065197
§ 371 (c)(1),
(2) Date: Sep. 27, 2021

(87) PCT Pub. No.: WO2020/192946
PCT Pub. Date: Oct. 1, 2020

(65) Prior Publication Data
US 2022/0150831 A1    May 12, 2022

Related U.S. Application Data

(60) Provisional application No. 62/824,805, filed on Mar. 27, 2019.

(51) Int. Cl.
*H04W 52/02*    (2009.01)
*H04W 4/80*    (2018.01)
*H04W 84/18*    (2009.01)

(52) U.S. Cl.
CPC ......... *H04W 52/0229* (2013.01); *H04W 4/80* (2018.02); *H04W 84/18* (2013.01)

(58) Field of Classification Search
CPC ... H04W 52/0229; H04W 4/80; H04W 84/18; H04W 52/0235; Y02D 30/70
See application file for complete search history.

(56) References Cited

U.S. PATENT DOCUMENTS

| | | | |
|---|---|---|---|
| 2014/0112229 A1* | 4/2014 | Merlin | H04L 5/0055 370/311 |
| 2015/0208349 A1* | 7/2015 | Ramamurthy | H04W 52/028 370/311 |
| 2020/0029278 A1* | 1/2020 | Mallat | H04W 4/80 |

OTHER PUBLICATIONS

Gavrikov, Paul, et al., "Using Bluetooth Low Energy to trigger an ultra-low power FSK wake-up receiver", 25th IEEE International Conference on Electronics, Circuits and Systems (ICECS), Dec. 9, 2018, pp. 1-4.

(Continued)

*Primary Examiner* — Marisol Figueroa
(74) *Attorney, Agent, or Firm* — Murphy, Bilak & Homiller, PLLC

(57) ABSTRACT

A method performed by a low-power node (LPN) in a wireless mesh network, wherein the LPN comprises a main receiver and a wakeup receiver, and wherein the method comprises: performing the following first operations in response to an event trigger: activating the wakeup receiver while maintaining the main receiver in an inactive state, and sending a polling message to a second node in the wireless mesh network; for a predetermined duration, determining whether a wakeup signal has been received from the second node via the wakeup receiver; and performing a plurality of second operations based on determining that the wakeup signal has been received, the second operations including: activating the main receiver, and receiving, from the second node via the main receiver, a response to the polling message.

24 Claims, 11 Drawing Sheets

(56) References Cited

OTHER PUBLICATIONS

Heydon, Robin, et al., "Mesh Profile", Bluetooth® Specification, Revision v1.0.1, Mesh Working Group, Jan. 21, 2019, pp. 1-333.
Ren, Kai, "Bluetooth Mesh Networking: Friendship", http://blog.bluetooth.com/bluetooth-mesh-networking-series-friendship, Aug. 24, 2017, pp. 1-10.

* cited by examiner

WAKEUP RADIO FOR LOW POWER NODES IN BLUETOOTH

TECHNICAL FIELD

The present invention generally relates to wireless communication networks, and more specifically relates to improvements to forwarding of data messages in mesh networks, such as Bluetooth mesh networks.

BACKGROUND

Bluetooth™ refers generally to a standardized group of technologies usable to exchange data between devices over short distances using radio transmission and reception in the 2.4-GHz ISM band. The promulgation and management of Bluetooth standards is done by various committees of the Bluetooth SIG, of which over 30,000 companies are members.

Bluetooth Low Energy (LE) is a particular version of Bluetooth technology that was first standardized by the Bluetooth SIG in 2010. Bluetooth LE is generally targeted at low-power applications that can tolerate lower-rate communications than, e.g., more traditional Bluetooth applications. Furthermore, Bluetooth LE is suitable for inexpensive devices that are constrained in terms of memory and computational resources.

Even so, Bluetooth LE leverages a robust frequency-hopping spread spectrum approach that transmits data over 40 channels. Furthermore, a Bluetooth LE-compliant radio includes multiple physical layer (PHY) options that support data rates from 125 kb/s to 2 Mb/s, multiple power levels, from 1 mW to 100 mW, as well as multiple security options.

Bluetooth LE also supports multiple network topologies, including a conventional point-to-point topology used for establishing one-to-one (1:1) communications between two devices. In addition, Bluetooth LE supports a broadcast (one-to-many, or 1:m) device communications. The broadcast topology can be used for localized information sharing and for location services such as retail point-of-interest information, indoor navigation and wayfinding, and item/asset tracking.

Finally, Bluetooth LE supports a mesh topology that can be used for establishing many-to-many (m:m) device communications. The mesh topology based on Bluetooth LE can enable the creation of large-scale device networks such as for control, monitoring, and automation systems where tens, hundreds, or thousands of devices need to reliably and securely communicate with each other. In the Bluetooth LE mesh topology, each device in a mesh network potentially can communicate with every other device in the mesh network. Communication is achieved using messages, and devices can relay messages to other devices so that the end-to-end communication range is extended far beyond the radio range of each individual device.

Devices that are part of a Bluetooth LE mesh network are often referred to as "nodes" whereas other devices not part of the mesh (e.g., even though within range of the mesh) are often referred to as "unprovisioned devices." The process of transforming an unprovisioned device into a node is often referred to as "provisioning," while the device responsible for adding a node to a network and configuring its behavior is often referred to as a "provisioner." Provisioning is a secure procedure which results in an unprovisioned device possessing a series of encryption keys and being known to the provisioner, such as a tablet or smartphone.

As mentioned above, communication in a Bluetooth mesh network is "message-oriented" and various message types are defined. For example, when a node needs to query the status of other nodes or needs to control other nodes in some way, it can send a message of a suitable type. If a node needs to report its status to other nodes, it can send a message of suitable type. Messages must be sent from an address and to an address. Bluetooth mesh topology supports three different types of addresses.

A unicast address uniquely identifies a single element (e.g., devices can include one or more elements), and unicast addresses are assigned to devices during the provisioning process. A group address is a multicast address which represents one or more elements. A virtual address may be assigned to one or more elements, spanning one or more nodes.

To further facilitate the use of Bluetooth LE in mesh topologies, the Bluetooth SIG promulgated the Mesh Profile Specification in July 2017. FIG. 1 shows an exemplary layered mesh architecture based on Bluetooth LE, as specified by the Bluetooth SIG. At the top is the Model layer, which defines models used to standardize the operation of typical user scenarios, such as models for lighting and sensors. The Model layer is further defined in other Bluetooth specifications, including a Bluetooth Mesh Model specification. The Foundation Model layer defines the states, messages, and models required to configure and manage a mesh network.

The Access layer defines how higher-layer applications can use the upper transport layer. It defines the format of the application data; it defines and controls the application data encryption and decryption performed in the upper transport layer; and it checks whether the incoming application data has been received in the context of the right network and application keys before forwarding it to the higher layer.

The Transport layer is subdivided into the Upper and Lower Transport Layers. The Upper Transport Layer encrypts, decrypts, and authenticates application data and is designed to provide confidentiality of access messages. It also defines how transport control messages are used to manage the upper transport layer between nodes, including when used by the "Friend" feature, which is discussed in more detail below.

The Lower Transport Layer defines how upper transport layer messages are segmented and reassembled into multiple Lower Transport protocol data units (PDUs) to deliver large upper transport layer messages to other nodes. It also defines a single control message to manage segmentation and reassembly.

The Network Layer defines how transport messages are addressed towards one or more elements. It defines the network message format that allows Transport PDUs to be transported by the bearer layer. The network layer decides whether to relay/forward messages, accept them for further processing, or reject them. It also defines how a network message is encrypted and authenticated.

The bearer layer defines how network messages are transported between nodes. There are two bearers defined, the advertising bearer and the GATT bearer. At the bottom of the exemplary architecture shown in FIG. 1 are the Bluetooth LE radio layers. FIG. 2 illustrates an exemplary integration of Bluetooth mesh networking with the Bluetooth LE architecture shown in FIG. 1. In FIG. 2, shading is used to indicate blocks or layers that are part of the Bluetooth LE specification. The BLE device architecture contains a controller and a host. At the bottom are the Bluetooth LE physical (PHY) and link layers, which typically can be implemented in the Bluetooth controller.

The layers above link layer typically can be implemented on the Bluetooth host device. The host may configure and control the controller by means of commands sent via the host-controller interface (HCI), while the controller may report events or similar to the host. Bluetooth Mesh functionality is implemented in the host and can be built on any BLE controller supporting Bluetooth v4.0 or later.

On the left side of FIG. 2 are Bluetooth LE higher layers that can be utilized independent of mesh networking functionality. The non-shaded blocks on the right side above the link layer correspond to the mesh networking architecture shown in FIG. 1 (plus provisioning). In this manner, applications (shown at the top-most layer in FIG. 2) can utilize both mesh and non-mesh functionality of the underlying Bluetooth LE technology.

Currently, Bluetooth mesh networking is based on "flooding" which uses broadcasting over a set of shared channels—the "advertisement channels." A node acting as a relay in a Bluetooth mesh network scans the advertisement channels for mesh messages. When a message is detected and received the node checks if it is the destination of the message. If the node is not the destination of the message the node checks if it has already received and forwarded the message. If yes, the message is discarded. If not, the message is forwarded in the mesh network by re-transmitting it over the advertisement channels so that the neighbors of the node can receive it.

Typically, some random delay is introduced before forwarding the message to avoid collisions. By means of this distributed mechanism, the message is forwarded from node to node(s) in the network so that the message arrives at the destination. Furthermore, this "advertising" technique also repeats the message on three separate physical channels—the so-called "advertisement channels"—that are spaced in frequency to guarantee robustness to frequency selective fading and interference.

On the receiver side, devices must scan all channels periodically. Therefore, it is not possible to predict in which channel a message is received. To lower the probability of message collisions on all advertisement channels, the Bluetooth Mesh specification recommends randomizing the gap between consecutive messages within an advertising event. Up to 10 ms delay is allowed between successive messages of an advertising event.

Due to the unsynchronized nature of Bluetooth mesh networks, if a node cannot scan continuously, then it is possible that it will not receive mesh messages that it should be processing, including security updates. Low-power nodes in a Bluetooth mesh network utilize a concept known as "friendship" to limit the amount of time that their receivers must actively scan for messages. "Friendship" is a special relationship between a Low Power node and one neighboring Friend node. These nodes must be within a single hop of each other and in the same subnet. A Friend node may be friends with multiple Low Power nodes, but a Low Power node can only have a single Friend node.

Once friendship is established, the Friend node performs several actions that help reduce the power consumption on the Low Power node. For example, the Friend node maintains a Friend Queue for the Low Power node, in which it stores incoming messages addressed to the Low Power node. The Friend node delivers those messages to the Low Power node when requested by the Low Power node. Also, the Friend node delivers security updates to the Low Power node.

In order to reduce and/or optimize the power consumption of a Low Power node, a polling mechanism is used to minimize the Low Power node's receive window. This allows a Low Power node to control the timing of updates from a Friend node by indicating when it is available to receive messages. FIG. 3 shows an exemplary timing diagram of message exchange between a Low Power node and its Friend node in a Bluetooth Mesh network.

As shown in FIG. 3, the Low Power node can send a Request (referred to as a "Friend Poll" message) to the Friend node while the Low Power node is otherwise sleeping. The Friend node is required to send a Response no earlier than ReceiveDelay milliseconds (ms) and no later than ReceiveDelay+ReceiveWindow ms after reception of the Request. ReceiveDelay is configurable in the range 10-255 ms, and ReceiveWindow is configurable in the range 1-255 ms.

A Low Power node can sleep during the ReceiveDelay but needs to listen during a ReceiveWindow until a response is received. After receiving the Response, the Low Power node can return to sleep. In general, Friendship allows battery-powered devices in a Bluetooth Mesh network to sleep most of the time. This is particularly efficient for devices that generate traffic seldomly and do not expect incoming messages. A Low Power node that polls the Friend very infrequently (e.g., every hour) can theoretically operate for 20 years on a coin cell battery (e.g., 220 mAh capacity).

However, such a Low Power node is only reachable in downlink when it wakes up and polls the Friend node. On the other hand, a battery-powered Bluetooth Mesh device that acts as an actuator (e.g., a door lock, a valve, a window blind) needs to react to incoming messages within delays typically from few hundreds of ms to less than a minute, even though the actual rate of incoming messages may be very low (e.g., from few minutes to many hours).

In these scenarios, a battery-powered device acting as a Low Power node needs to schedule frequent Request and Response message transactions. Furthermore, the Low Power node may need to remain active for a significant amount of time during each of these transactions. These requirements can significantly reduce the operational life of such actuator-type Low Power nodes with fixed battery capacities, and/or require more frequent battery replacements.

SUMMARY

Embodiments of the present disclosure address these and other problems and provide specific improvements to communication between nodes in a wireless mesh network, such as by providing novel techniques for integrating wakeup receivers with low-power mesh nodes. In this manner, embodiments can facilitate low-latency responses to infrequent, asynchronous events while maintaining very low energy consumption.

Some exemplary embodiments of the present disclosure include methods and/or procedures performed by a low-power node (LPN) in a wireless mesh network, with the LPN having a main receiver and a wakeup receiver. For example, the exemplary methods and/or procedures can be performed by a Bluetooth Low-Energy device (or component thereof) in a Bluetooth mesh network.

The exemplary methods and/or procedures can include performing the following first operations in response to an event trigger: activating the wakeup receiver while maintaining the main receiver in an inactive state, and sending a polling message to a second node in the wireless mesh network. In embodiments where the wireless mesh network is a Bluetooth Mesh network, the second node can be a Friend node with respect to the LPN.

The exemplary methods and/or procedures can also include, for a predetermined duration, determining whether a wakeup signal has been received from the second node via the wakeup receiver. For example, the predetermined duration can be established by the initialization and expiration of a timer within the LPN.

The exemplary methods and/or procedures can also include, based on determining that the wakeup signal has been received, performing a plurality of second operations. These second operations can include activating the main receiver and receiving, from the second node via the main receiver, a response to the polling message. In some embodiments, the second operations can also include the deactivating the wakeup receiver. In some embodiments, the second operations can also include, after receiving the response to the polling message, deactivating the main receiver while maintaining the wakeup receiver in an inactive state.

In some embodiments, the exemplary methods and/or procedures can also include, based on determining that the wakeup signal was not received during the predetermined duration, deactivating the wakeup receiver while maintaining the main receiver in an inactive state.

Other exemplary embodiments of the present disclosure include other methods and/or performed by a second node in association with a low-power node (LPN) in a wireless mesh network, according to various embodiments of the present disclosure. For example, the exemplary methods and/or procedures can be performed by a Friend node to a Bluetooth Low-Energy device or node (or component thereof) in a Bluetooth mesh network.

In some embodiments, these exemplary methods and/or procedures can include receiving, from a further node in the wireless mesh network, a message intended for the LPN. In such embodiments, the exemplary methods and/or procedures can also include buffering the received message.

The exemplary methods and/or procedures can include monitoring for polling messages from the LPN. The exemplary methods and/or procedures can also include, based on determining that a polling message was received from the LPN, determining whether there are any messages intended for the LPN that are buffered at the second node. The exemplary methods and/or procedures can also include, based on determining that there are messages intended for the LPN that are buffered at the second node, sending a wakeup signal to the LPN. The exemplary methods and/or procedures can also include subsequently sending a response to the polling message to the LPN.

In some embodiments, the exemplary methods and/or procedures can also include, based on determining that there are no messages intended for the LPN that are buffered at the second node, refraining from sending both the wakeup signal and the response to the polling message, as well as resuming monitoring for further polling messages from the LPN.

Other exemplary embodiments include wireless mesh network nodes (e.g., user equipment, wireless device, IoT device, Bluetooth Low-Energy device, etc. or component thereof) configured to perform operations corresponding to various ones of the exemplary methods and/or procedures described above. Other exemplary embodiments include non-transitory, computer-readable media storing program instructions that, when executed by at least one processor, configure such nodes to perform operations corresponding to the exemplary methods and/or procedures described above.

These and other objects, features and advantages of the exemplary embodiments of the present disclosure will become apparent upon reading the following detailed description of the exemplary embodiments of the present disclosure.

DETAILED DESCRIPTION

As briefly mentioned above, a Bluetooth Mesh Low Power node coupled with an actuator type device should react to incoming messages within delays typically from few hundreds of ms to less than a minute, even though the actual rate of incoming messages may be very low (e.g., from few minutes to many hours). To meet these requirements, the Low Power node must schedule frequent Request and Response message transactions.

Furthermore, the Low Power node may need to remain active for a significant amount of time during each of these transactions. These requirements can significantly reduce the operational life of such actuator-type Low Power nodes with fixed battery capacities, and/or require more frequent battery replacements. This is discussed in more detail below.

Figure 5:
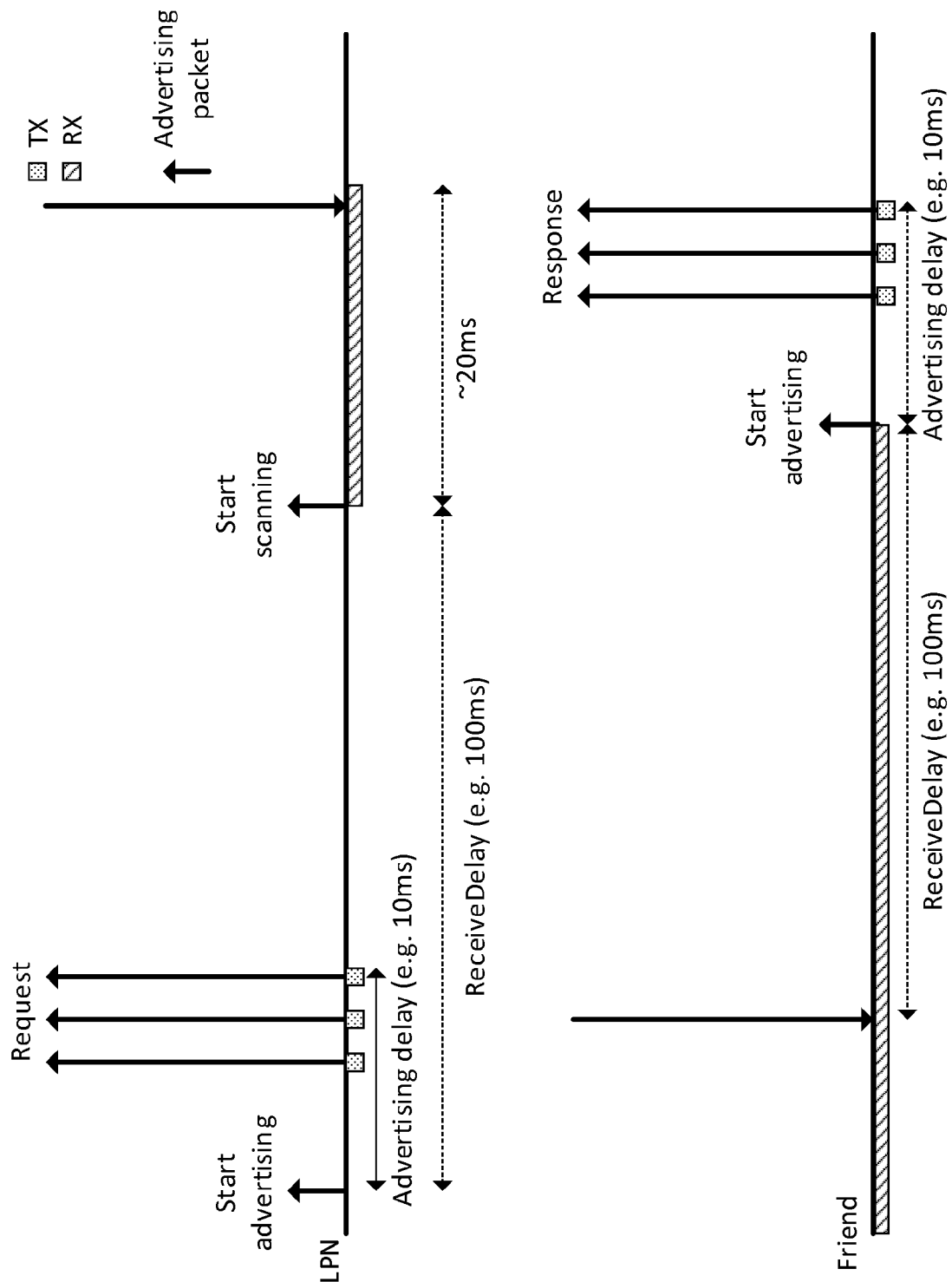
FIG. 5 shows an exemplary timing diagram of message transactions between a Low Power node and a Friend node in a Bluetooth Mesh network.

FIG. 5 shows an exemplary timing diagram of message transactions between a Low Power node and a Friend node in a Bluetooth Mesh network. As shown in FIG. 5, for each Request, a Low Power node needs to send an advertising triplet and keep the receiver on for a sufficient time to receive a Response. The advertising event introduces an unpredictable delay at reception due to the following components:

The controller does not immediately start advertising after a command is received by the Host-Controller-Interface.

A randomized delay (up to 10 ms) between subsequent advertising packets in the same event is recommended by the specifications to reduce collisions.

The receiver scans all channels periodically and the transmitter does not know what channel the receiver is scanning at the moment of the transmission.

In view of all three components, an average delay of minimum 10 ms is typically present. Since this delay will occur at both the Low Power node and the Friend side, the Low Power node needs to keep its receiver active for an average of 20 ms before receiving the Response (e.g., a message or a Friend Update). Furthermore, this active time can be up to 255 ms (i.e., the max ReceiveWindow) if the Response is lost due to interference and/or blockage in the channel.

Without considering any data transaction or losses, and assuming a polling rate of 1 request per second, the receiver duty cycle of the Low Power node is 0.02, which limits the lifetime of the Bluetooth device running on a coin cell battery (220 mAh) to approximately 40 days. As such, the combination of long battery lifetime and delay-constrained operations (for incoming messages) is not achievable based on the Friendship techniques currently defined for Bluetooth Mesh networks.

Figure 4:
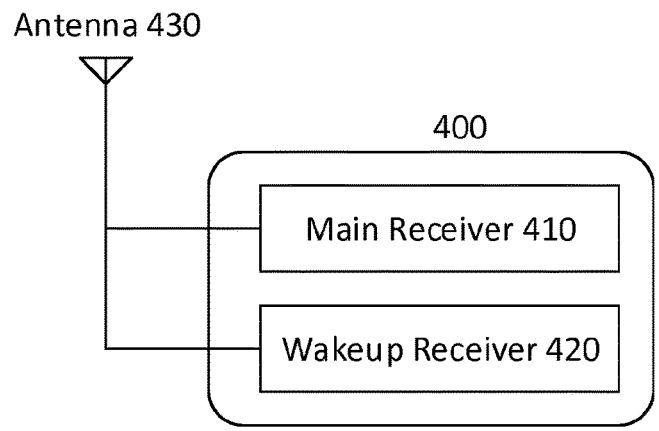
FIG. 4 shows a high-level block diagram of a receiver device that includes a main receiver and a wakeup receiver (WUR).

One technique that has been used to significantly reduce power consumption in wireless receivers is to include a wakeup receiver (also referred to as "wakeup radio") alongside the conventional (or "main") receiver. FIG. 4 shows a high-level block diagram of a receiver device 400, which includes a main receiver 410 and a wakeup receiver (WUR) 420, both of which are connected to an antenna 430. In this architecture, WUR 420 only needs to be able to detect the presence of a wake-up signal (WUS), while the main receiver 410 is used to receive any transmitted data or other signaling. Such techniques are currently being standardized for wireless LAN by the IEEE 802.11ba task group, and are expected to be released in 2019. Support for NB-IoT/LTE-M IDLE mode wake-up signaling is also included in release 15 of the 3GPP specifications.

Wake-up receivers, such as shown in FIG. 4, are also relevant for Bluetooth Mesh devices. The power consumption of a Bluetooth receiver is in the order of 30 mW, whereas a wakeup receiver can consume less than 100 μW. As such, the inclusion of a wakeup receiver is a potential lower-power alternate to Friendship for Bluetooth Mesh Low Power nodes. Even so, without considering any polling and data transactions, a Low Power node having a wakeup radio receiver that is always on is limited to approximately 250 days operation on a coin cell battery.

Figure 6:
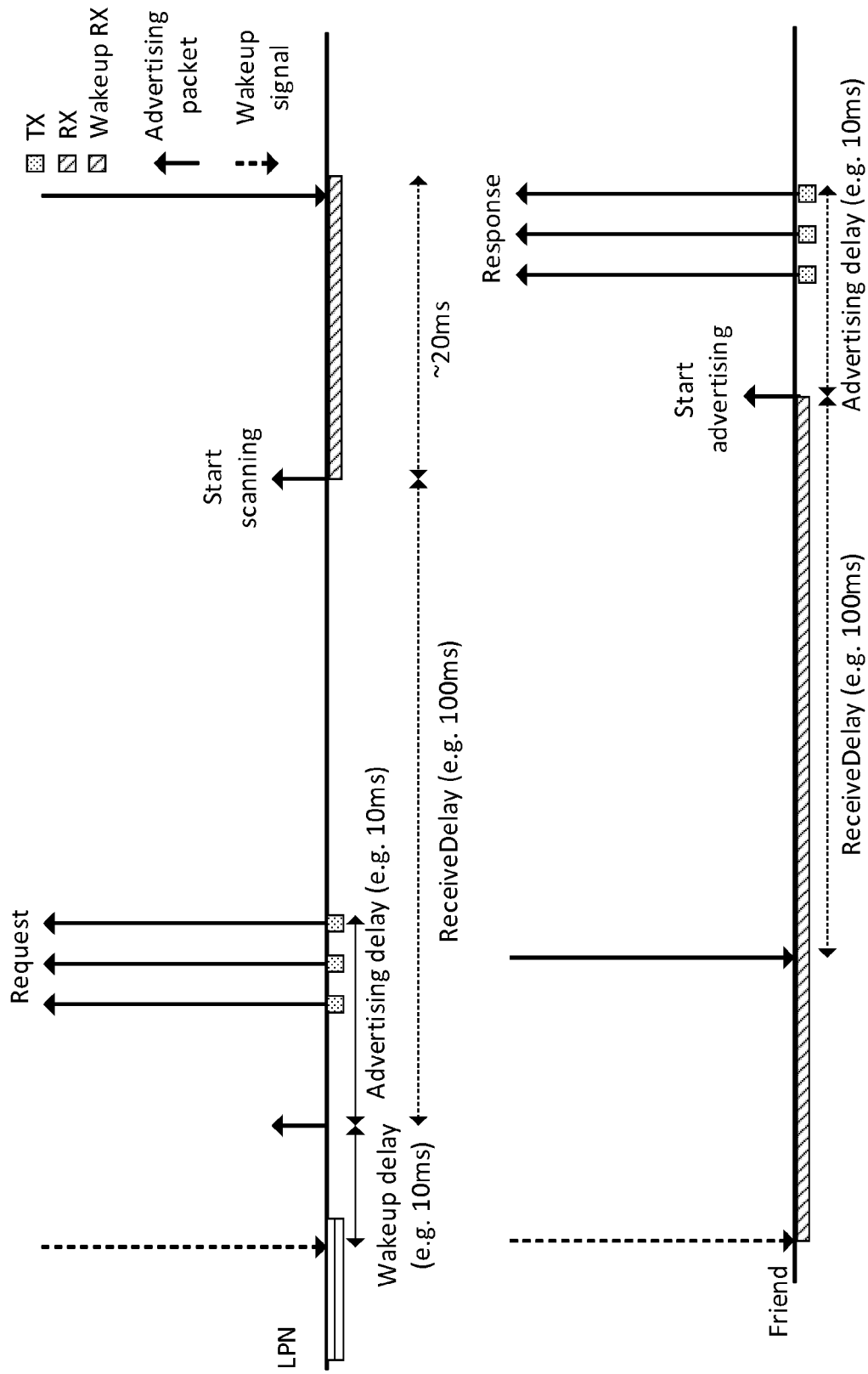
FIG. 6 shows an exemplary timing diagram of message transactions between a Low Power node with a wake-up receiver and a Friend node in a Bluetooth Mesh network.

In general, with a wakeup radio receiver turned on, a device is continuously reachable with very low latency and does not need to be polled frequently. FIG. 6 shows an exemplary timing diagram of message transactions between a Low Power node with a wake-up receiver and a Friend node in a Bluetooth Mesh network. In particular, the arrangement shown in FIG. 6 is based on the 802.11 ba solution, in which the wakeup receiver operates at a duty cycle rather than being always on.

By letting the wakeup radio in the battery-powered device sleep periodically, the operational lifetime of the device on a single battery can be increased. One problem in applying the 802.11ba solution with wakeup duty cycle to Bluetooth Mesh devices is that it requires synchronization between the Low Power node and the Friend node to be sure that the wakeup signal is received during the ON-period of the wakeup receiver.

Assuming synchronization is achievable, it has the following consequences. First, the ON-period of the wakeup receiver in the Low Power node must account for the clock drift between the two devices (i.e., 500 parts-per-million (ppm) in Bluetooth radios) and possible delays in the transmission of the wakeup signal from the Friend node. Second, during the OFF-period of the wakeup receiver, the Low Power node needs to keep the real time clock (RTC) oscillator and associated timers on, thus requiring higher energy consumption compared to a low power sleep state without RTC—which is the case in the current Friendship operation.

For example, an exemplary Bluetooth Mesh system-on-chip (SoC) can consume 1.2 μA in sleep state without RTC, compared to 1.9 μA (~6 μW) in sleep state with RTC running. Assuming infrequent messages (e.g., every hour), an ON-period of at least 10 ms per second, and a power consumption during OFF-period of 6 μW (e.g., with RTC running), the lifetime of a Bluetooth device running on a coin cell battery (220 mAh) is less than 10 years.

This is approximately half of what is achievable by current Low Power nodes based on Friendship. As such, the low-delay reachability obtained by applying wakeup receiver comes at the cost of a reduced battery lifetime compared to Friendship.

Accordingly, exemplary embodiments of the present disclosure provide novel techniques for integrating and using a wakeup radio (WUR) in a battery-powered Bluetooth Mesh device. Unlike conventional approaches, these novel techniques facilitate both low-delay reachability and low power consumption for Bluetooth Mesh Low Power nodes (LPNs). Moreover, embodiments of these novel techniques can be beneficial for battery-powered actuator-type nodes (e.g., door locks) that must quickly react to incoming messages even though the rate of such messages is low. In general, such embodiments include the LPN regularly polling the Friend node for messages over the Bluetooth Mesh advertising bearer. After each such polling message, the LPN keeps its WUR receiver on for a short duration. If the Friend node has a buffered message for the LPN, it responds with a wake-up signal that indicates to the LPN that it should activate the conventional Bluetooth Low-Energy (BLE) receiver to scan for advertising messages. Subsequently, the Friend node sends the message over the mesh advertising bearer.

Otherwise, if the Friend node does not have a buffered message for the LPN, it does not respond with a wake-up signal. When the LPN has not received this signal at the end of the short duration, it powers down the WUR. One advantage and/or benefit of these novel techniques is that by letting the LPN initiate each handshake and avoiding having the LPN main receiver on unless the Friend node has a message to deliver to the LPN, the LPN does not need to run the RTC during idle sleep periods, thereby reducing energy consumption and prolonging battery life. Moreover, the scanning of the advertising channels is minimized.

In contrast to conventional Friendship operation, these novel techniques enable, allow, and/or facilitate a Low Power node to turn on its main BLE receiver only if a message is present. This advantageously reduces the poll interval affecting the overall power consumption significantly.

In contrast to the 802.11ba WUR operation, a LPN embodying these novel techniques does not need to keep its WUR synchronized for its duty cycle, since the WUR is only activated upon generation of a poll message, which is an asynchronous event. This advantageously allows the LPN to sleep with RTC off between poll messages, thereby reducing energy consumption and prolonging battery life.

Another advantage and/or benefit of these novel techniques is that they can be implemented in Bluetooth Mesh nodes without modifying the behavior of the controller portion of a node. Rather, procedures to trigger the external wakeup radio receiver can be implemented in the host portion of the node.

Figure 7:
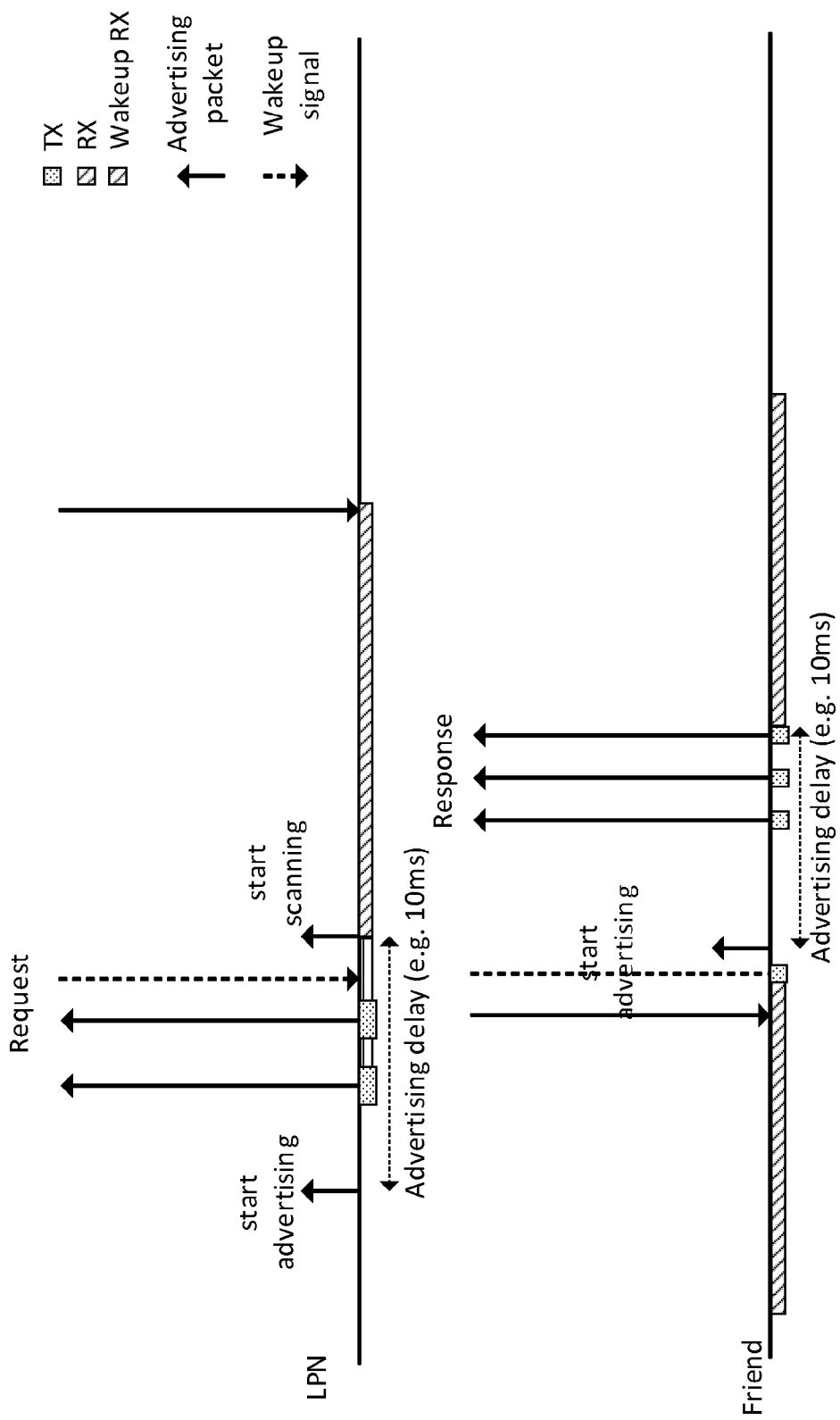
FIG. 7 shows another exemplary timing diagram of message transactions between a Low Power node with a wake-up receiver and a Friend node in a Bluetooth Mesh network, according to various exemplary embodiments of the present disclosure.
Figure 9:
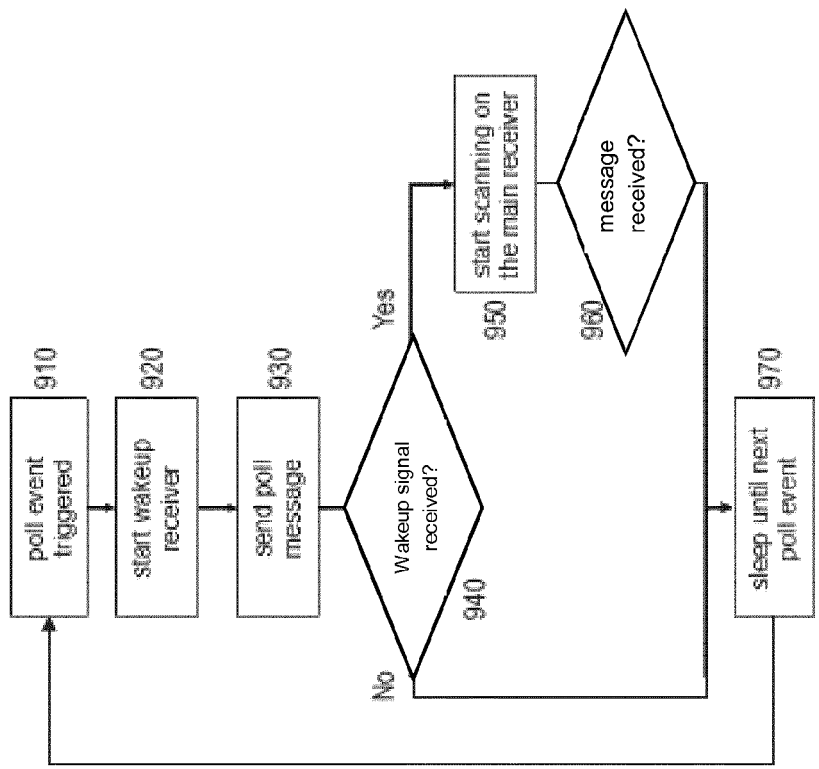
FIG. 9 illustrates an exemplary procedure performed by a Low-Power node in a Bluetooth Mesh network, according to various exemplary embodiments of the present disclosure.
Figure 8:
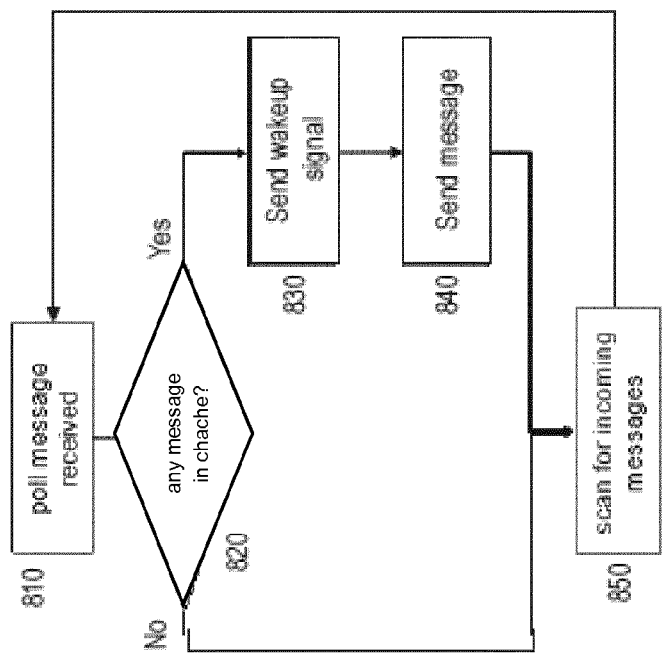
FIG. 8 illustrates an exemplary procedure performed by a Friend node in a Bluetooth Mesh network, according to various exemplary embodiments of the present disclosure.

FIG. 7 shows an exemplary timing diagram of message transactions between a Low Power node with a wake-up receiver and a Friend node in a Bluetooth Mesh network, according to various exemplary embodiments of the present disclosure. FIG. 8 illustrates an exemplary procedure performed by a Friend node in a Bluetooth Mesh network, according to various exemplary embodiments of the present disclosure. FIG. 9 illustrates an exemplary procedure performed by a Low-Power node (LPN) in a Bluetooth Mesh network, according to various exemplary embodiments of the present disclosure. Although the operations in FIGS. 8-9 are given numerical labels, these are merely for facilitating the following explanation and, unless expressly stated to the contrary, should not be interpreted as requiring the operations in FIG. 8-9 to conform to any particular order.

The combination of these three figures is the basis for the following description. In block 910 of FIG. 9, a poll event is triggered in the LPN. This event can be triggered in various ways, such as by expiration of a periodic timer (e.g., every 1 second). The poll event is also indicated as the "start advertising" event in FIG. 7. In response, the LPN starts its WUR (block 920) and also begins transmitting the polling message (block 930). The sending of the poll message is also indicated by the two repetitions of the request in FIG. 7. In block 810 of FIG. 8, the Friend node receives the polling message transmitted by the LPN in block 930. In the example shown in FIG. 7, the Friend node does not receives the first repetition, but does receive the second repetition. In response, in block 820 the Friend node determines if there are any messages buffered (e.g., in a cache) for the LPN.

If this determination is positive ("Yes"), the Friend node sends a wakeup signal to the LPN (block 830). In block 940 of FIG. 9, the LPN receives the wakeup signal transmitted by the Friend node via the activated WUR. In FIG. 7, the transmission and reception of the wakeup signal is illustrated by the dashed vertical lines.

Based on receiving the wakeup signal, the LPN understands that the Friend node has information to send to it. In response, the LPN activates its main receiver to start scanning for a message from the Friend node (block 950). After some advertising delay, shown in FIG. 7, the Friend node sends the message (block 840). This is illustrated in FIG. 7 as three repetitions. The LPN receives the second repetition (block 960) and then returns to sleep until the next triggered poll event (block 970). Similarly, the Friend node resumes scanning for incoming messages, including polling messages from the LPN (block 850).

On the other hand, if the LPN does not detect a wakeup signal after some short duration in block 940, it determines that the Friend node does not have any information to send it, and returns to sleep (block 970) until the next triggered poll event without activating its main receiver. This can occur, for example, if the Friend node determines (e.g., in block 820) that it does not have any buffered messages for the LPN. In such case, the Friend node can also resume scanning for incoming messages (block 850) without sending the wakeup signal.

Assuming infrequent messages (e.g., every hour), an average of one (1) poll message per second, and a power consumption during OFF-period of 4 µW (e.g., with RTC off), the lifetime of a Bluetooth LPN operating in the manner shown in FIGS. 7-9 is approximately 18 years running on a coin cell battery (220 mAh). Furthermore, such a device is quickly reachable within seconds even with this prolonged battery life.

Although a wakeup receiver can be integrated with the conventional receiver, it can be advantageous to implement it as a separate entity in the existing BLE receiver architecture. For example, this separation can facilitate a wakeup receiver implementation that minimizes and/or reduces energy consumption without significantly affecting the performance of the main receiver.

Figure 10:
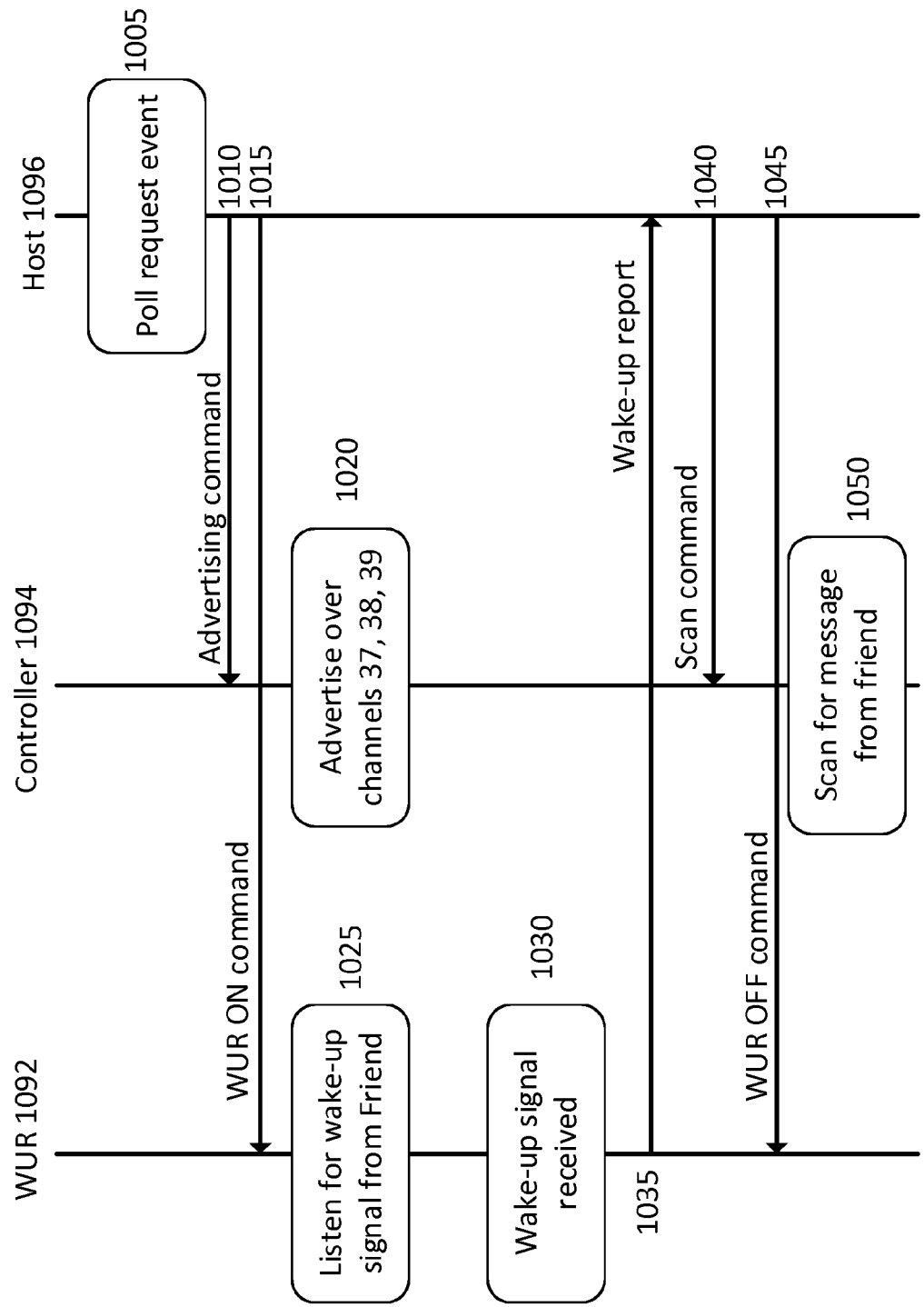
FIGS. 10-11 illustrate two different exemplary signaling flows between a wake-up receiver (WUR), a controller, and a host of Low-Power node in a Bluetooth Mesh network, according to various exemplary embodiments.
Figure 11:
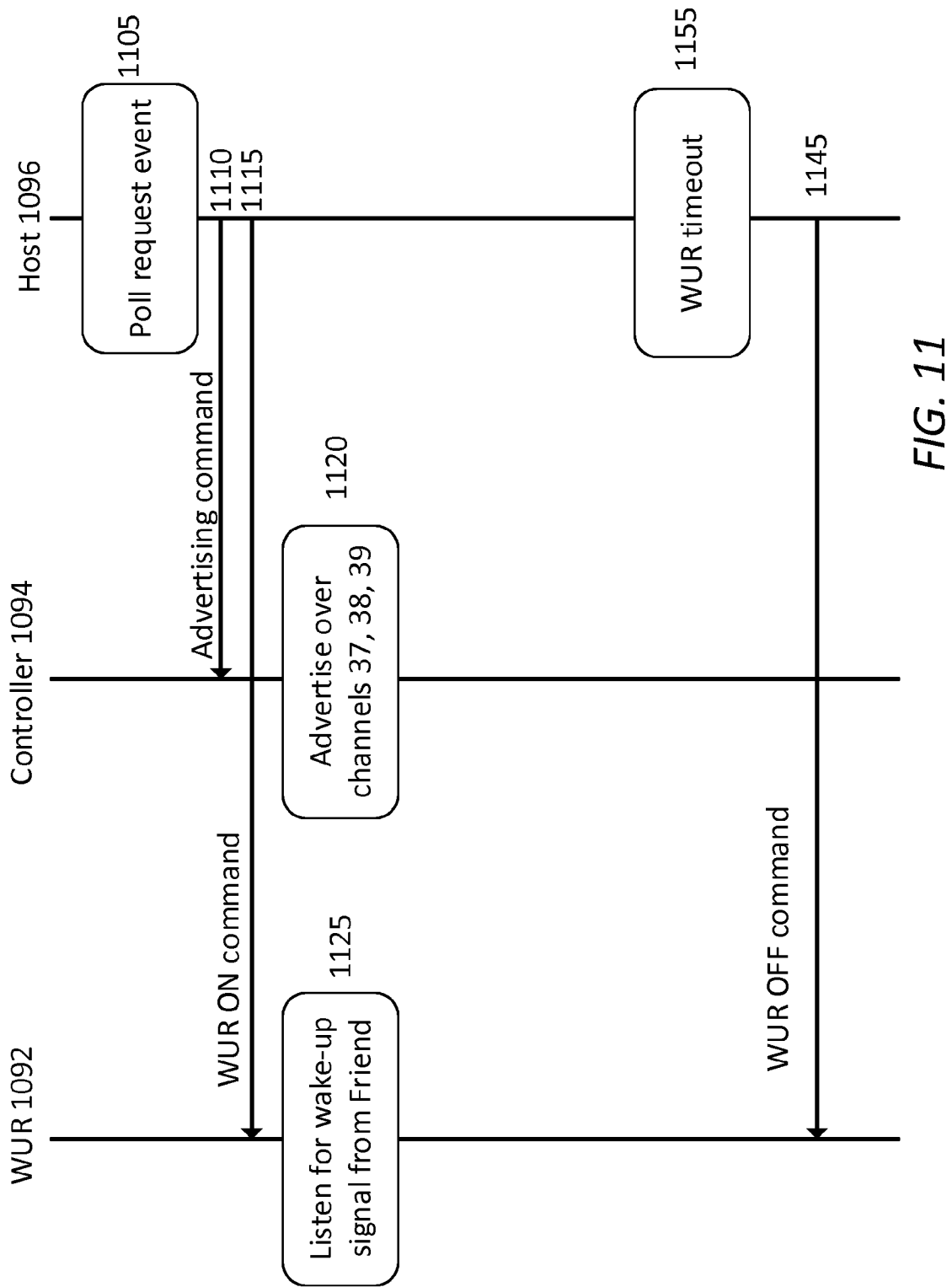

FIGS. 10-11 illustrate two different exemplary signalling flows between a wake-up receiver (WUR) 1092, a controller 1094, and a host 1096 of a Low-Power node (LPN) in a Bluetooth Mesh network, according to various exemplary embodiments. Although the operations in FIGS. 10-11 are given numerical labels, these are merely for facilitating the following explanation and, unless expressly stated to the contrary, should not be interpreted as requiring the operations in FIG. 10-11 to conform to any particular order.

More specifically, FIG. 10 shows an exemplary signaling flow between WUR 1092, controller 1094, and host 1096 when the Friend node has buffered information to send to the LPN.

In operation 1005, a poll event is triggered in the host, such as described above with respect to block 910 of FIG. 9. In operation 1010, the host sends an advertising command to the controller.

This command instructs the controller to begin transmitting a polling message or request, such as in block 930 of FIG. 9. In response, the controller begins advertising (operation 1020) by transmitting the polling message over three different Bluetooth channels, e.g., channels 37-39 as indicated in FIG. 10. In addition, the host sends turn-on command to the WUR (operation 1015) and the WUR begins listening for the wake-up signal from the Friend node (operation 1025).

Subsequently, the WUR receives the wake-up signal from the Friend node (operation 1030) and sends a report about the received signal to the host (operation 1035). In response, the host sends a scan command to the controller (operation 1040) to turn on the main receiver. In response, the controller turns on the main receiver and begins scanning for the response from the Friend node (operation 1050). In addition, the host also sends a turn-off command to the WUR (operation 1045). In addition, FIG. 11 shows an exemplary signaling flow between WUR 1092, controller 1094, and host 1096 when the Friend node does not have buffered information to send to the LPN.

Operations 1105-1125 shown in FIG. 11 are substantially identical to respective operations 1005-1025 in FIG. 10 described above. After sending the WUR turn-on command, the host sets a WUR timer. In operation 1155, this timer expires or times out without the host receiving a wakeup report from the WUR, such as in FIG. 10. In response, the host sends a turn-off command to the WUR (operation 1145).

In general, there must be some common understanding between the wake-up signal transmitter (e.g., the Friend node) and the wake-up signal receiver (e.g., the LPN) as to which channel should carry the wake-up signal. In some embodiments, the wake-up signal can be transmitted on a fixed, pre-defined channel (e.g., as defined in Bluetooth Mesh standards). In some embodiments, the wake-up signal can be transmitted on a channel agreed by the LPN and the Friend node during Friendship establishment. In some embodiments, the wake-up signal can be transmitted on a channel determined by the LPN in association with each polling event, and signaled to the Friend node in the respective polling messages.

Figure 12:
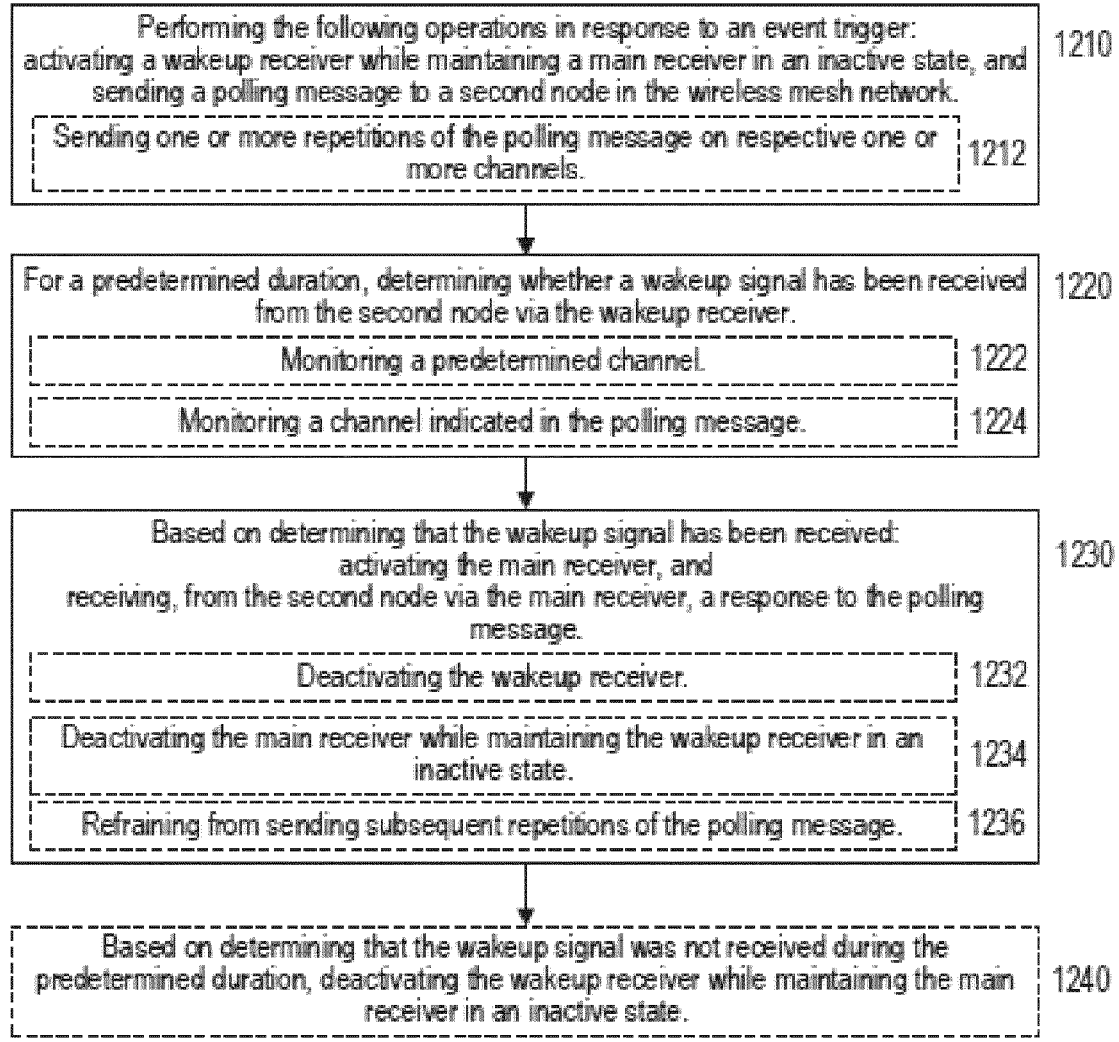
FIG. 12 shows a flow diagram of exemplary methods and/or procedures performed by a low-power node in a wireless mesh network, according to various exemplary embodiments.

FIG. 12 shows a flow diagram of an exemplary method and/or procedure performed by a low-power node (LPN) in a wireless mesh network, with the LPN having a main receiver and a wakeup receiver. For example, the exemplary method and/or procedure can be performed by a Bluetooth Low-Energy device (or component thereof) in a Bluetooth mesh network. As a more specific example, the exemplary method and/or procedure shown in FIG. 12 can be implemented in a node configured according to FIG. 14 (and described below). Furthermore, the exemplary method and/or procedure shown in FIG. 12 can be utilized cooperatively with the exemplary method and/or procedures shown in other figures to provide various exemplary benefits described herein.

Although FIG. 12 shows blocks in a particular order, this order is merely exemplary, and the operations shown in FIG. 12 can be performed in a different order than shown, and can be combined and/or divided into blocks having different functionality. Optional operations are indicated by dashed lines. The exemplary method and/or procedure illustrated in FIG. 12 can include the operations of block 1210, where the LPN can perform the following first operations in response to an event trigger: activating the wakeup receiver while maintaining the main receiver in an inactive state, and sending a polling message to a second node in the wireless mesh network. In embodiments where the wireless mesh network is a Bluetooth Mesh network, the second node can be a Friend node with respect to the LPN.

In some embodiments, the operations of block 1210 can include the operations of sub-block 1212, where the LPN can send one or more repetitions of the polling message on respective one or more channels, e.g., advertisement channels. The exemplary method and/or procedure can also include the operations of block 1220, where the LPN can, for a predetermined duration, determining whether a wakeup signal has been received from the second node via the wakeup receiver. For example, the predetermined duration can be established by the initialization and expiration of a timer within the LPN.

In some embodiments, the operations of block 1220 can include the operations of sub-block 1222, where the LPN can monitor a predetermined channel for the wakeup signal. In various embodiments, the predetermined channel can be a pre-defined channel (e.g., by Bluetooth specifications) or a channel determined between the LPN and the second node before performing the first operations, such as during establishment of a "Friendship" relationship between the two nodes.

In other embodiments, the polling message can include an indication of a channel to carry the wakeup signal. In such embodiments, the operations of block 1220 can include the operations of sub-block 1224, where the LPN can monitor the indicated channel for the wakeup signal. The exemplary method and/or procedure can also include the operations of block 1230, where the LPN can, based on determining that the wakeup signal has been received, perform a plurality of second operations. These second operations can include activating the main receiver and receiving, from the second node via the main receiver, a response to the polling message.

In some embodiments, the second operations can also include the deactivating the wakeup receiver (sub-block 1232). In some embodiments, the second operations can also include, after receiving the response to the polling message, deactivating the main receiver while maintaining the wakeup receiver in an inactive state (1234).

In embodiments where the LPN sends repetitions of the polling message on respective channels (sub-block 1212), the LPN can determine whether the wakeup signal has been received in response to each of the repetitions. In such embodiments, the operations of block 1230 can also include the operations of sub-block 1236, where based on determining that the wakeup signal was received in response to a particular repetition, the LPN can refrain from sending subsequent repetitions of the polling message.

In some embodiments, the exemplary method and/or procedure can also include the operations of block 1240, where the LPN can, based on determining that the wakeup signal was not received during the predetermined duration, deactivate the wakeup receiver while maintaining the main receiver in an inactive state.

Figure 13:
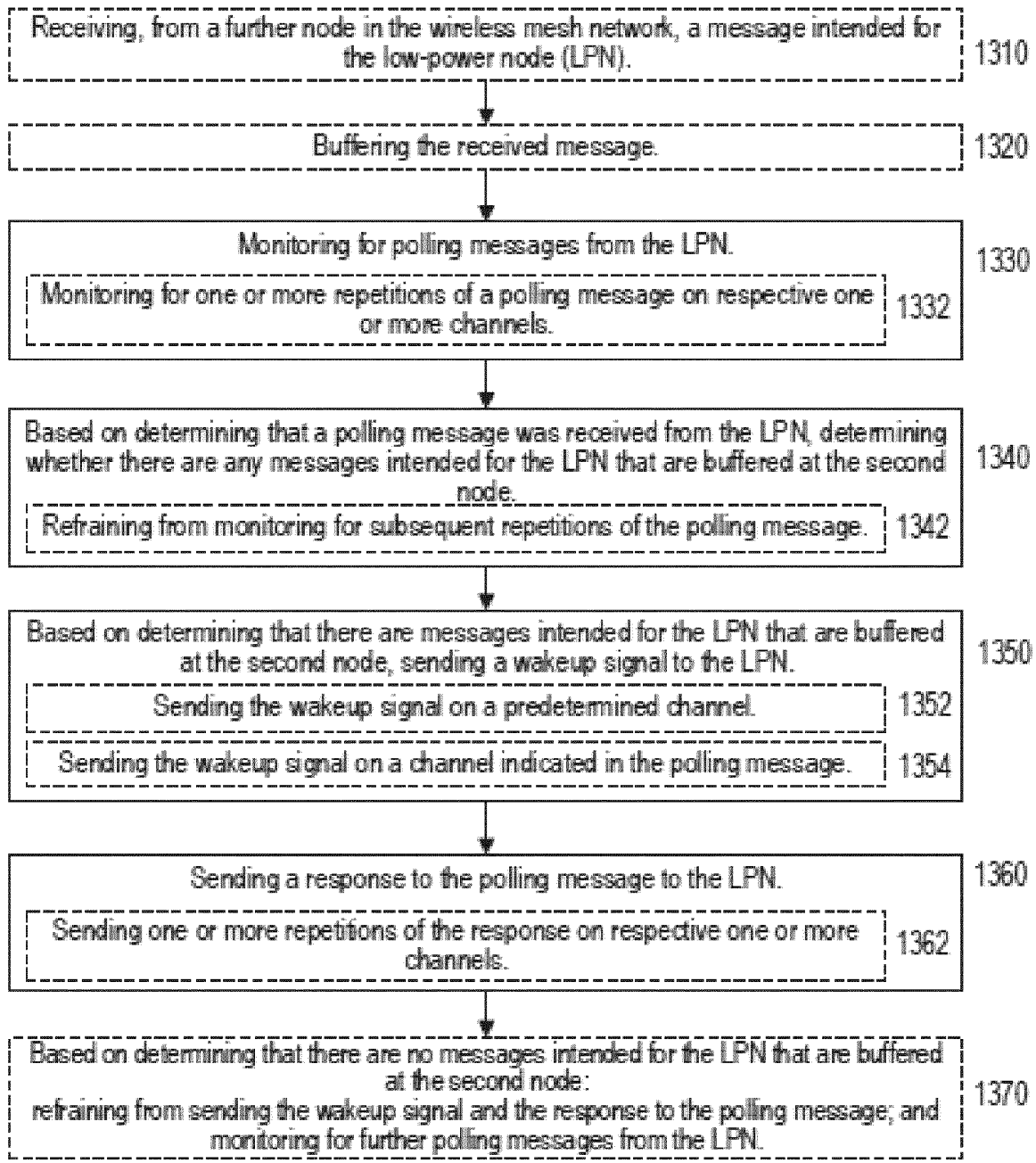
FIG. 13 shows a flow diagram of exemplary methods and/or procedures performed by a second node in a wireless mesh network, according to various exemplary embodiments.

FIG. 13 shows a flow diagram of an exemplary method and/or procedure performed by a second node in association with a low-power node (LPN) in a wireless mesh network, according to various embodiments of the present disclosure. For example, the exemplary method and/or procedure can be performed by a Friend node to a Bluetooth Low-Energy device or node (or component thereof) in a Bluetooth mesh network. As a more specific example, the exemplary method and/or procedure shown in FIG. 13 can be implemented in a node configured according to FIG. 14 (and described below). Furthermore, the exemplary method and/or procedure shown in FIG. 13 can be utilized cooperatively with the exemplary method and/or procedures shown in other figures to provide various exemplary benefits described herein.

Although FIG. 13 shows blocks in a particular order, this order is merely exemplary, and the operations shown in FIG. 13 can be performed in a different order than shown, and can be combined and/or divided into blocks having different functionality. Optional operations are indicated by dashed lines. In some embodiments, the exemplary method and/or procedure can include the operations of block 1310, where the second node can receive, from a further node in the wireless mesh network, a message intended for the LPN. In such embodiments, the exemplary method and/or procedure can include the operations of block 1320, where the second node can buffer the received message.

The exemplary method and/or procedure can include the operations of block 1330, where the second node can monitor for polling messages from the LPN. In some embodiments, the operations of block 1330 can include the operations of sub-block 1332, where the second node can monitor for one or more repetitions of a polling message on respective one or more channels, e.g., advertisement channels. The exemplary method and/or procedure can also include the operations of block 1340, where the second node can, based on determining that a polling message was received from the LPN, determine whether there are any messages intended for the LPN that are buffered at the second node. In embodiments where the second node monitors for repetitions of the polling message (e.g., sub-block 1332), the operations of block 1340 can include the operations of subblock 1342, where the second node can refrain from monitoring for subsequent repetitions based on determining that a particular repetition of the polling message was received on a particular channel.

The exemplary method and/or procedure can also include the operations of block 1350, where the second node can, based on determining that there are messages intended for the LPN that are buffered at the second node, send a wakeup signal to the LPN. In some embodiments, the operations of block 1350 can include the operations of sub-block 1352, where the second node can send the wakeup signal on a predetermined channel. In various embodiments, the predetermined channel can be a pre-defined channel (e.g., by Bluetooth specifications) or a channel determined between the LPN and the second node before performing the first operations, such as during establishment of a "Friendship" relationship between the two nodes.

In other embodiments, a received polling message can include an indication of a channel to carry the wakeup signal. In such embodiments, the operations of block 1350 can include the operations of sub-block 1354, where the second node can send the wakeup signal on the indicated channel. The exemplary method and/or procedure can also include the operations of block 1360, where the second node can subsequently send a response to the polling message to the LPN.

This response can be sent after sending the wakeup signal, as illustrated by timing diagrams shown in various figures herein. In some embodiments, the operations of block 1360 can also include the operations of sub-block 1362, where the second node can send one or more repetitions of the response on respective one or more channels, e.g., advertisement channels. In some embodiments, the exemplary method and/or procedure can also include the operations of block 1370, where the second node can, based on determining that there are no messages intended for the LPN that are buffered at the second node, refrain from sending both the wakeup signal and the response to the polling message. Furthermore, the second node can also resume monitoring for further polling messages from the LPN.

Figure 14:
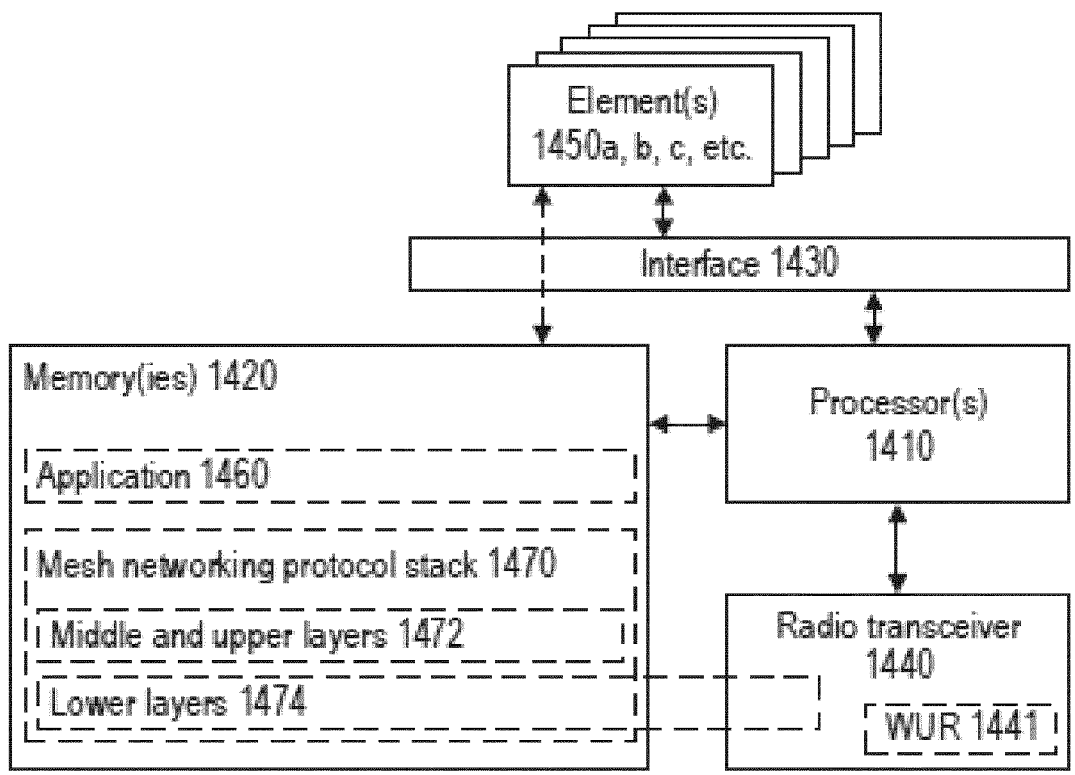
FIG. 14 shows a block diagram of an exemplary wireless mesh network device and/or node, according to various embodiments of the present disclosure.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc. FIG. 14 shows a block diagram of an exemplary wireless mesh network device and/or node 1400 according to various embodiments of the present disclosure. For example, exemplary node 1400 can be configured by execution of instructions, stored on a computer-readable medium, to perform operations corresponding to one or more of the exemplary methods and/or procedures described above.

Exemplary node 1400 can comprise one or more processors 1410 that can be operably connected to one or more memories 1420 via address and data buses, serial ports, or other methods and/or structures known to those of ordinary skill in the art. Memory(ies) 1420 comprises software code or programs executed by processor(s) 1410 that facilitates, causes and/or programs exemplary node 1400 to perform various operations.

Figure 1:
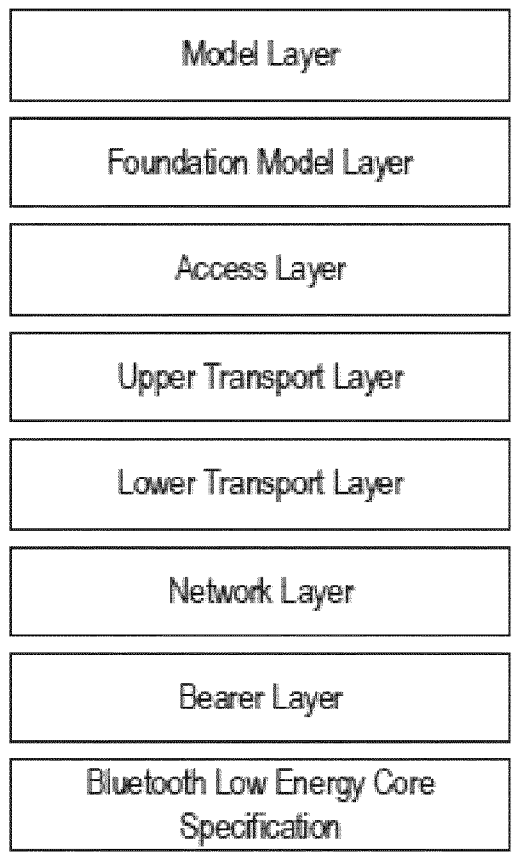
FIG. 1 shows an exemplary layered mesh architecture based on Bluetooth LE, as specified by the Bluetooth SIG.
Figure 2:
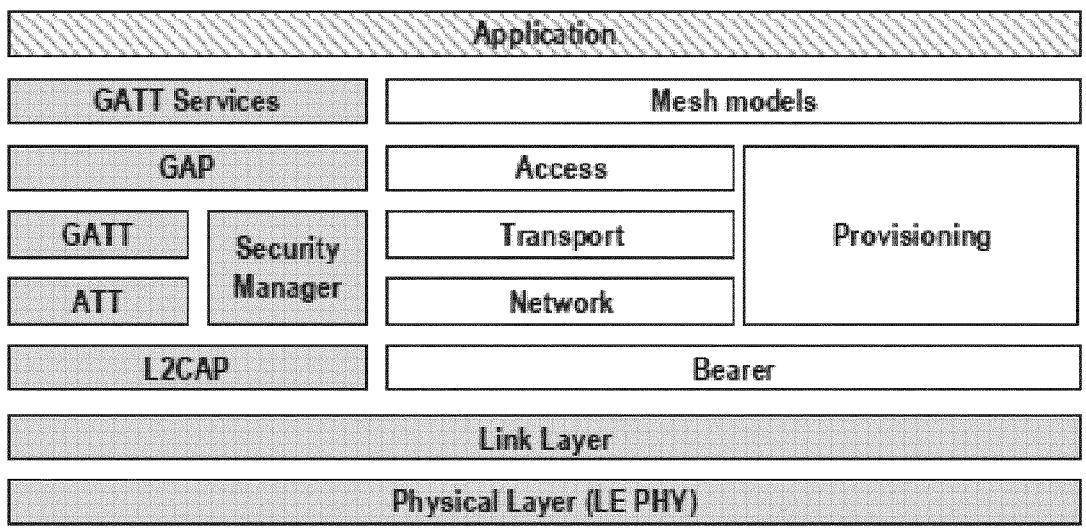
FIG. 2 illustrates an exemplary integration of Bluetooth mesh networking with the Bluetooth LE architecture shown in FIG. 1.
Figure 3:
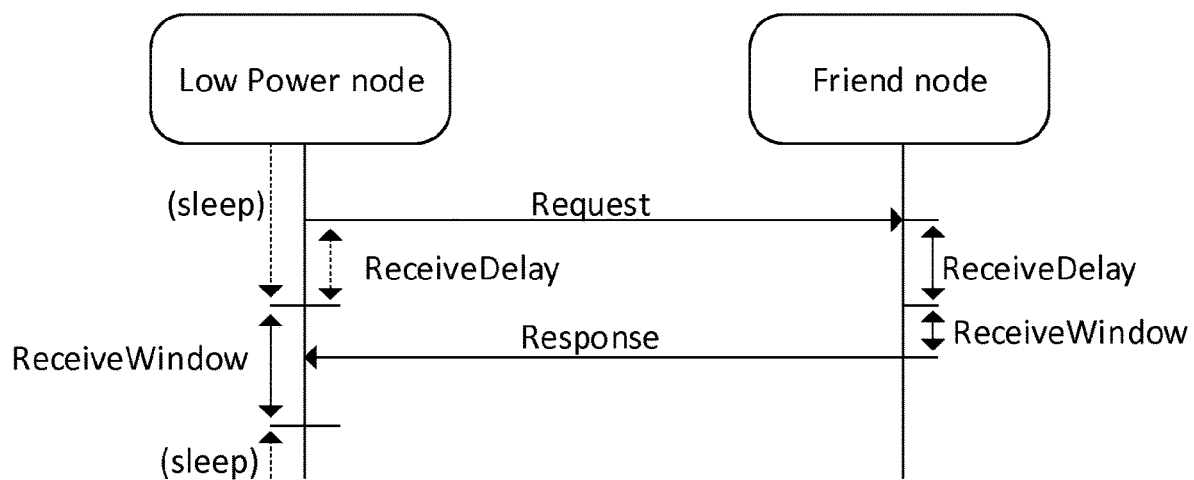
FIG. 3 shows an exemplary timing diagram of message exchange between a Low Power node and its Friend node in a Bluetooth Mesh network.

As shown in FIG. 14, memory(ies) 1420 can include an application 1460 (e.g., application code) and a mesh networking protocol stack 1470, which can further comprise middle and upper layers 1472 and lower layers 1474. For example, protocol stack 1470 can comprise a Bluetooth mesh networking protocol stack, such as shown in FIGS. 1 and 2 and described in more detail above. In such case, the lower layers 1474 can include the Bluetooth LE PHY and link layers, with the remainder of the Bluetooth mesh networking protocol stack comprising middle and upper layers 1472. Furthermore, protocol stack 1470 can include software code that, when executed by processor(s) 1410, configures node 1400 to perform any of the exemplary methods and/or procedures described above, including those shown in FIG. 9-12.

In some embodiments, memory(ies) 1420 and processor(s) 1410 can be subdivided into multiple processors and memories such that a particular memory stores code for lower layers 1474 that is executed by a particular processor, and a further memory stores code for middle and upper layers 1472 that is executed by a further processor. For example, in Bluetooth mesh networking embodiments, the particular memory and particular processor can operate as a Bluetooth device or controller while the further memory and further processor can operate as a Bluetooth host, with a host-controller interface (HCI) between the two.

Exemplary node 1400 also includes a radio transceiver 1440 that is coupled to and communicates with processor 1410. Radio transceiver 1440 includes a transmitter and receiver operable (e.g., in conjunction with processor 1410) to transmit and receive wireless signals at a particular frequency or band of frequencies. In Bluetooth mesh networking embodiments, radio transceiver 1440 can be configured to transmit and receive according to the Bluetooth LE standard in the 2.4-GHz ISM band. In some embodiments, radio transceiver 1440 can comprise portions of lower layers 1474, as illustrated in FIG. 14. For example, in Bluetooth mesh network embodiments, the Bluetooth LE physical layer can be implemented by radio transceiver 1440 in combination with software code executed by processor 1410.

Furthermore, although not shown, radio transceiver 1440 can include one or more antennas that facilitate transmission and reception in the appropriate frequency band.

In some embodiments, node 1400 can also include one or more element(s) 1450*a*, 1450*b*, 1450*c*, etc. that can provide an interface with the physical environment in which node 1400 is located. For example, element(s) 1450 can monitor and/or collect data related to operation of a physical process or machine. As another example, element(s) 1450 can control one or more aspects of such a physical process.

As such, it can be desirable to transmit the collected data to and/or receive control commands from a remote source via the mesh networking functionality of node 1400. This can be done, for example, by application 1460 which can communicate with both mesh networking stack 1470 and the element(s) 1450. This logical communication between application 1460 and element(s) 1450 is illustrated in FIG. 14 as a dashed line.

In some embodiments, however, the physical communication (illustrated by solid lines) between application 1460 and element(s) 1450 can be performed via an interface circuit 1430 interposed between element(s) 1450 and processor(s) 1410.

As described herein, device, node, and/or apparatus can be represented by a semiconductor chip, a chipset, or a (hardware) module comprising such chip or chipset; this, however, does not exclude the possibility that a functionality of a device, node, or apparatus, instead of being hardware implemented, be implemented as a software module such as a computer program or a computer program product comprising executable software code portions for execution or being run on a processor. Furthermore, functionality of a device, node, or apparatus can be implemented by any combination of hardware and software. A device, node, or apparatus can also be regarded as an assembly of multiple devices and/or apparatuses, whether functionally in cooperation with or independently of each other. Moreover, devices, nodes, and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure.

Various different exemplary embodiments can be used together with one another, as well as interchangeably therewith, as should be understood by those having ordinary skill in the art. In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously.

Further, to the extent that the prior art knowledge has not been explicitly incorporated by reference herein above, it is explicitly incorporated herein in its entirety. All publications referenced are incorporated herein by reference in their entireties.

Notably, modifications and other embodiments of the disclosed embodiments will come to mind to one skilled in the art having the benefit of the teachings presented in the foregoing descriptions and the associated drawings. Therefore, it is to be understood that the scope of the disclosure is not to be limited to the specific embodiments disclosed and that modifications and other variants are intended to be included within the scope. Although specific terms can be employed herein, they are used in a generic and descriptive sense only and not for purposes of limitation.

The invention claimed is:

1. A method performed by a low-power node (LPN) in a wireless mesh network, wherein the LPN comprises a main receiver and a wakeup receiver, and wherein the method comprises:
    performing the following first operations in response to an event trigger:
        activating the wakeup receiver while maintaining the main receiver in an inactive state, and
        sending a polling message to a second node in the wireless mesh network;
    for a predetermined duration after sending the polling message, determining whether a wakeup signal has been received from the second node via the wakeup receiver; and
    performing second operations based on determining that the wakeup signal has been received, the second operations including: activating the main receiver, and receiving, from the second node via the main receiver, a response to the polling message.

2. The method of claim 1, wherein the second operations also include deactivating the wakeup receiver.

3. The method of claim 2, wherein the second operations also include, after receiving a response to the polling message, deactivating the main receiver while maintaining the wakeup receiver in an inactive state.

4. The method of claim 1, further comprising, based on determining that the wakeup signal was not received during the predetermined duration, deactivating the wakeup receiver while maintaining the main receiver in an inactive state.

5. The method of claim 1, wherein sending the polling message comprises sending one or more repetitions of the polling message on respective one or more channels.

6. The method of claim 5, wherein:
    determining whether the wakeup signal has been received is performed in response to each of the repetitions; and
    the method further comprises, based on determining that the wakeup signal was received in response to a particular repetition, refraining from sending subsequent repetitions of the polling message.

7. The method of claim 1, wherein receiving the response to the polling messages comprises monitoring for one or more repetitions of the response on respective one or more channels.

8. The method of claim 1, wherein:
    determining whether the wakeup has been received comprises monitoring a predetermined channel; and
    the predetermined channel is one of the following: a pre-defined channel, and a channel determined between the LPN and the second node before performing the first operations.

9. The method of claim 1, wherein:
    the polling message comprises an indication of a channel to carry the wakeup signal; and
    determining whether the wakeup has been received comprises monitoring the indicated channel.

10. The method of claim 1, wherein the wireless mesh network is a Bluetooth Mesh network; and the second node is a Friend node with respect to the LPN.

11. A method performed by a second node in association with a low-power node (LPN) in a wireless mesh network, the method comprises:
    monitoring for polling messages from the LPN while the LPN's main receiver is in an inactive state;
    based on determining that a polling message was received from the LPN, determining whether there are any messages intended for the LPN that are buffered at the second node;
    based on determining that there are messages intended for the LPN that are buffered at the second node, sending a wakeup signal to the LPN's wakeup receiver; and
    subsequently sending a response to the polling message to the LPN's main receiver, which is activated based on the wakeup signal.

12. The method of claim 11, further comprising, based on determining that there are no messages intended for the LPN that are buffered at the second node:

refraining from sending both the wakeup signal and the response to the polling message; and monitoring for further polling messages from the LPN.

13. The method of claim 11, wherein monitoring for polling messages comprises monitoring for one or more repetitions of a polling message on respective one or more channels.

14. The method of claim 13, further comprising, based on determining that a particular repetition of the polling message was received on a particular channel, refraining from monitoring for subsequent repetitions of the polling message.

15. The method of claim 11, wherein sending the response to the polling message comprises sending one or more repetitions of the response on respective one or more channels.

16. The method of claim 11, wherein:
the wakeup signal is sent on a predetermined channel; and
the predetermined channel is one of the following: a pre-defined channel, or a channel determined between the second node and the LPN before monitoring for the polling messages.

17. The method of claim 11, wherein: the received polling message comprises an indication of a channel to carry the wakeup signal; and the wakeup signal is sent on the indicated channel.

18. The method of claim 11, further comprising:
receiving, from a further node in the wireless mesh network, a message intended for the LPN; and
buffering the received message.

19. The method of claim 11, wherein:
the wireless mesh network is a Bluetooth Mesh network; and
the second node is a Friend node with respect to the LPN.

20. A low-power node (LPN) in a wireless mesh network, wherein the LPN comprises:
a wireless transceiver configured to communicate with at least a second node in the wireless mesh network, wherein the wireless transceiver includes a main receiver and a wakeup receiver; and
processing circuitry operatively coupled to the wireless transceiver, whereby the processing circuitry and the wireless transceiver are configured to perform operations corresponding to the method of claim 1.

21. A non-transitory, computer-readable medium storing computer-executable instructions that, when executed by processing circuitry comprising a low-power node (LPN) in a wireless mesh network, configure the LPN to perform operations corresponding to the method of claim 1.

22. A second node in a wireless mesh network, wherein the second node comprises:
a wireless transceiver configured to communicate with at least a low-power node (LPN) in the wireless mesh network; and
processing circuitry operatively coupled to the wireless transceiver, whereby the processing circuitry and the wireless transceiver are configured to perform operations corresponding to the method of claim 11.

23. A non-transitory, computer-readable medium storing computer-executable instructions that, when executed by processing circuitry comprising a second node in a wireless mesh network, configure the second node to perform operations corresponding to the method of claim 11.

24. A wireless mesh network comprising:
the low-power node (LPN) of claim 20;
a second node comprising processing circuitry and a wireless transceiver that are configured to:
monitor for polling messages from the LPN while the LPN's main receiver is in the inactive state;
based on determining that a polling message was received from the LPN, determine whether there are any messages intended for the LPN that are buffered at the second node;
based on determining that there are messages intended for the LPN that are buffered at the second node, send a wakeup signal to the LPN's wakeup receiver; and
subsequently send a response to the polling message to the LPN's main receiver, which is activated based on the wakeup signal; and
one or more further nodes configured to send messages to the LPN via the second node.

* * * * *